(12) United States Patent
Danforth, Jr. et al.

(10) Patent No.: US 9,506,496 B2
(45) Date of Patent: Nov. 29, 2016

(54) LOCKABLE CONNECTION DEVICE WITH CLOSED RING TO HOLD AN OBJECT, SUCH AS A KEY, DOG TAG, AND THE LIKE

(71) Applicant: AHA LLC, Lenexa, KS (US)

(72) Inventors: Douglas D. Danforth, Jr., Prairie Village, KS (US); Warren V. Moore, Lenexa, KS (US); David R. Peck, Olathe, KS (US); Dale W. Sass, Gardner, KS (US); Tracy Hockenhull, Lenexa, KS (US); Craig Evink, Coon Rapids, MN (US); Scott Lefebvre, Zimmerman, MN (US); David R. Maroney, Cedar, MN (US)

(73) Assignee: AHA LLC, Lenexa, KS (US)

( * ) Notice: Subject to any disclaimer, the term of this patent is extended or adjusted under 35 U.S.C. 154(b) by 361 days.

(21) Appl. No.: 14/061,223

(22) Filed: Oct. 23, 2013

(65) Prior Publication Data

US 2014/0109359 A1 Apr. 24, 2014

Related U.S. Application Data

(60) Provisional application No. 61/717,307, filed on Oct. 23, 2012, provisional application No. 61/755,320, filed on Jan. 22, 2013.

(51) Int. Cl.
*A44B 15/00* (2006.01)
*F16B 45/02* (2006.01)
(Continued)

(52) U.S. Cl.
CPC ............ *F16B 45/02* (2013.01); *A44B 15/00* (2013.01); *A44B 15/002* (2013.01); *A45C 11/321* (2013.01);
(Continued)

(58) Field of Classification Search
CPC ........... Y10T 70/8676; Y10T 70/8757; Y10T 24/1379; Y10T 24/44291; Y10T 24/44299; Y10T 24/4453; Y10T 24/44538; Y10T 24/45026; Y10T 24/45251; Y10T 24/45225; F16B 45/02; A44B 15/00; A44B 15/005; A44B 15/002; A45F 5/02; A47G 29/10; G09F 3/00; A45C 11/324; A45C 11/323; A45C 11/328; A45C 11/32; A45C 11/326; A45C 11/321
USPC .......... 70/456 R, 457, 458, 459, 460; 24/3.6, 24/3.12, 576.1, 591.1, 594.1; 206/37.1–37.8, 38.1; 410/107, 111; D3/207–212, 221
See application file for complete search history.

(56) References Cited

U.S. PATENT DOCUMENTS 35,150 A 5/1862 Frazer
271,121 A 1/1883 Riley et al.
(Continued)

FOREIGN PATENT DOCUMENTS

| GE | 1721 U | 4/2012 |
|---|---|---|
| JP | 2000262311 A | 9/2000 |
| SU | 1567165 A1 | 5/1990 |

OTHER PUBLICATIONS

International Search Report and Written Opinion from PCT Application No. PCT/US2013/066395 entitled Lockable Connection Device With Closed Ring to Hold an Object, Such As a Key, Dog Tag, and the Like (Dated Feb. 20, 2014).
(Continued)

*Primary Examiner* — Lloyd Gall
(74) *Attorney, Agent, or Firm* — Hovey Williams LLP

(57) ABSTRACT

A connection device is operable to hold an object, such as a key, dog tag, and the like. The connection device broadly includes a ring and a body. The ring includes a ring end and is coupled to the body at a connection location spaced from the end. The ring presents a projecting ring portion defined between the connection location and the ring end. The projecting ring portion cooperates with the body to define therebetween a space so as to accommodate the object. The body includes an end-engaging portion spaced from the connection location. The ring end is engageable with the end-engaging portion of the body to secure the object on the projecting ring portion.

33 Claims, 11 Drawing Sheets

(51) Int. Cl.
    *A45C 11/32* (2006.01)
    *A47G 29/10* (2006.01)
(52) U.S. Cl.
    CPC .......... *A47G 29/10* (2013.01); *Y10T 24/45026* (2015.01); *Y10T 24/45225* (2015.01); *Y10T 24/45251* (2015.01); *Y10T 70/8676* (2015.04)

(56) References Cited

U.S. PATENT DOCUMENTS

| | | | |
|---|---|---|---|
| 368,135 A | 8/1887 | Crandall | |
| 368,136 A | 8/1887 | Degenhardt | |
| 534,452 A | 2/1895 | Schlarbaum | |
| 1,373,867 A | 4/1921 | Conner | |
| 1,719,662 A * | 7/1929 | Jones | A44C 5/2019 24/305 |
| 2,048,599 A | 7/1936 | Collins | |
| 2,115,342 A | 4/1938 | Moore | |
| 2,218,932 A | 10/1940 | Collins | |
| 2,232,668 A | 2/1941 | Schupbach | |
| 2,307,808 A | 1/1943 | Segal | |
| 2,451,091 A | 10/1948 | Johnson | |
| 2,457,195 A | 12/1948 | Bagnall | |
| 2,482,386 A | 9/1949 | Vaisey et al. | |
| 2,503,211 A | 4/1950 | Ormsbee | |
| 2,527,457 A * | 10/1950 | Schupbach | A44B 15/00 70/459 |
| 2,531,325 A | 11/1950 | Cesaris | |
| 2,620,650 A | 12/1952 | Cotti | |
| 2,791,899 A | 5/1957 | Marten | |
| 2,923,045 A | 2/1960 | Mount | |
| 3,362,201 A | 1/1968 | Lachin | |
| 3,430,470 A | 3/1969 | Muckleston | |
| 3,513,675 A | 5/1970 | Ryder, Jr. et al. | |
| 3,516,272 A | 6/1970 | Modrey | |
| 3,597,951 A | 8/1971 | Nadel | |
| 3,899,802 A | 8/1975 | Koehle | |
| 4,077,243 A | 3/1978 | Tyson | |
| 4,091,646 A | 5/1978 | Sugimoto | |
| 4,113,156 A | 9/1978 | Brito | |
| 4,129,021 A | 12/1978 | Brentini | |
| 4,422,315 A | 12/1983 | Klose | |
| 4,433,498 A | 2/1984 | Bienz | |
| 4,656,853 A | 4/1987 | Mancini | |
| 4,821,543 A | 4/1989 | Scungio | |
| 4,984,442 A | 1/1991 | Benson | |
| 5,170,644 A | 12/1992 | Calbro | |
| 5,367,896 A | 11/1994 | Sundberg | |
| 5,488,848 A | 2/1996 | Huang | |
| 5,495,734 A | 3/1996 | Yu | |
| D383,599 S | 9/1997 | Song | |
| D383,600 S | 9/1997 | Song | |
| 5,685,185 A | 11/1997 | MacDonald | |
| 6,283,348 B1 | 9/2001 | Wang | |
| 6,763,692 B1 | 7/2004 | Huang | |
| 6,848,287 B1 | 2/2005 | Huang | |
| D668,038 S | 10/2012 | Danforth, Jr. et al. | |
| D677,460 S * | 3/2013 | Danforth, Jr. | D3/208 |
| 8,402,800 B1 | 3/2013 | Hester | |
| 9,055,789 B2 * | 6/2015 | Danforth, Jr. | A44B 15/00 |
| 2003/0135966 A1 * | 7/2003 | Tejima | A44B 11/266 24/615 |
| 2004/0118173 A1 | 6/2004 | Huang | |
| 2009/0320770 A1 | 12/2009 | Rolain et al. | |
| 2010/0031476 A1 | 2/2010 | Coldiron | |
| 2011/0314879 A1 * | 12/2011 | Danforth, Jr. | A44B 15/00 70/459 |
| 2012/0023716 A1 | 2/2012 | Bluma | |

OTHER PUBLICATIONS

Printout from Aspen Pet Brand Website (www.aspenpet.com) of "TAGNABBIT" tag ring (printed Jul. 30, 2010).
Product Packaging for "TAGABINER" pet tag holder (Publicly available at least as early at Apr. 6, 2010).
PCT Search Report and Written Opinion from PCT Application No. PCT/US2011/041806 entitled Connection Device for Holding an Object, Such As a Key, Dog Tag, and the Like (Dated Feb. 27, 2012).
Office Action from U.S. Appl. No. 13/168,396, filed Jun. 24, 2011 (Action dated Oct. 21, 2013).

* cited by examiner

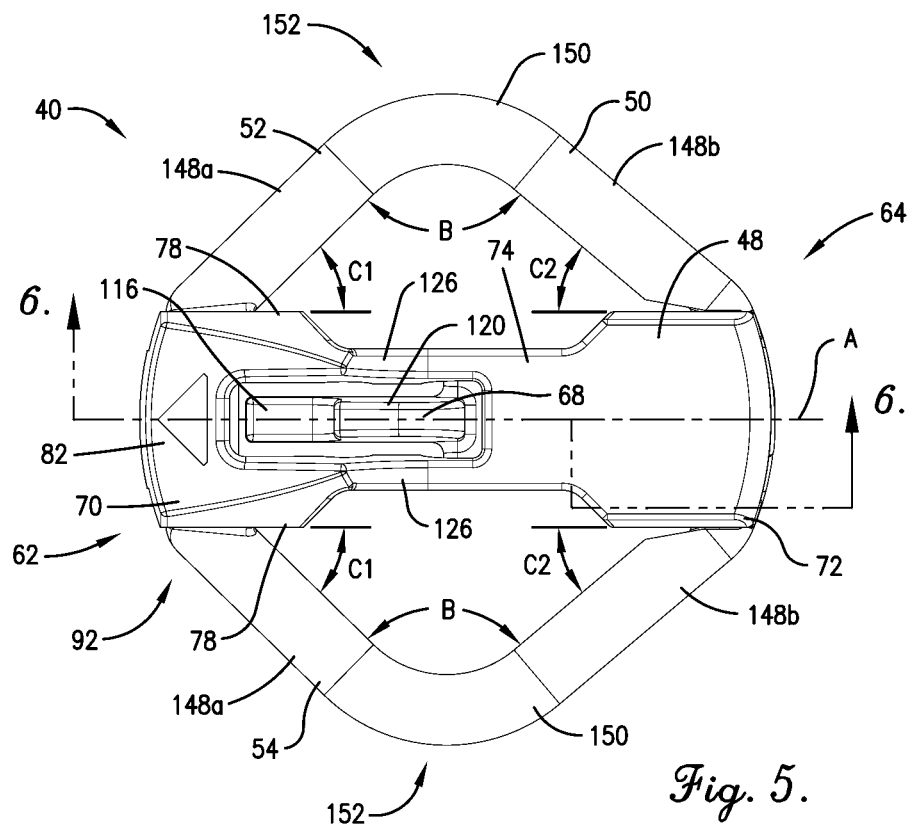
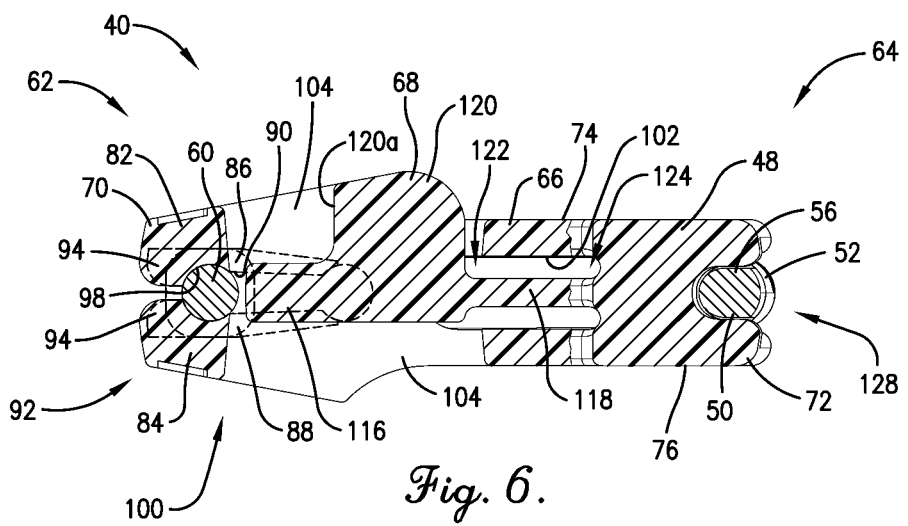

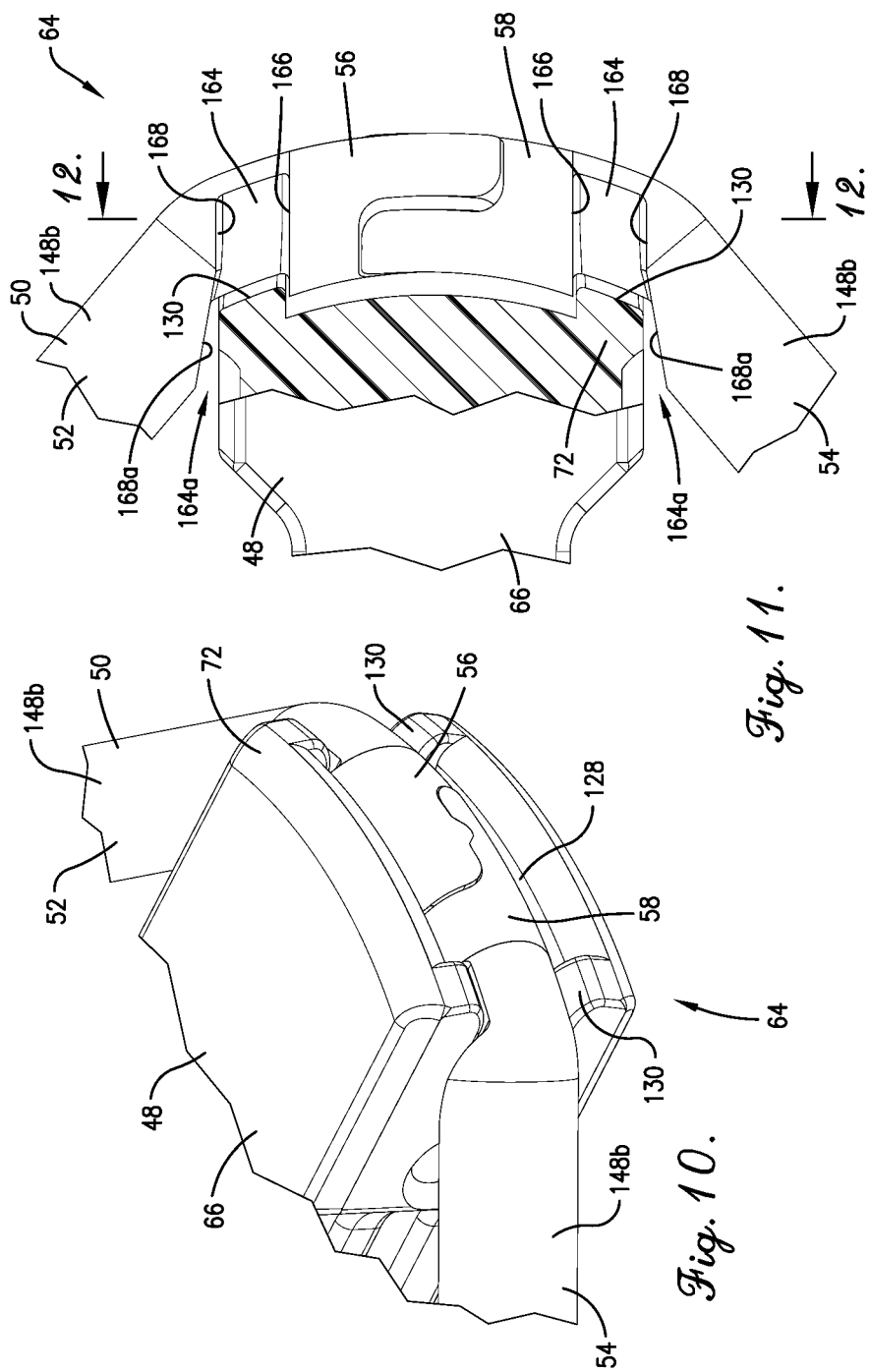

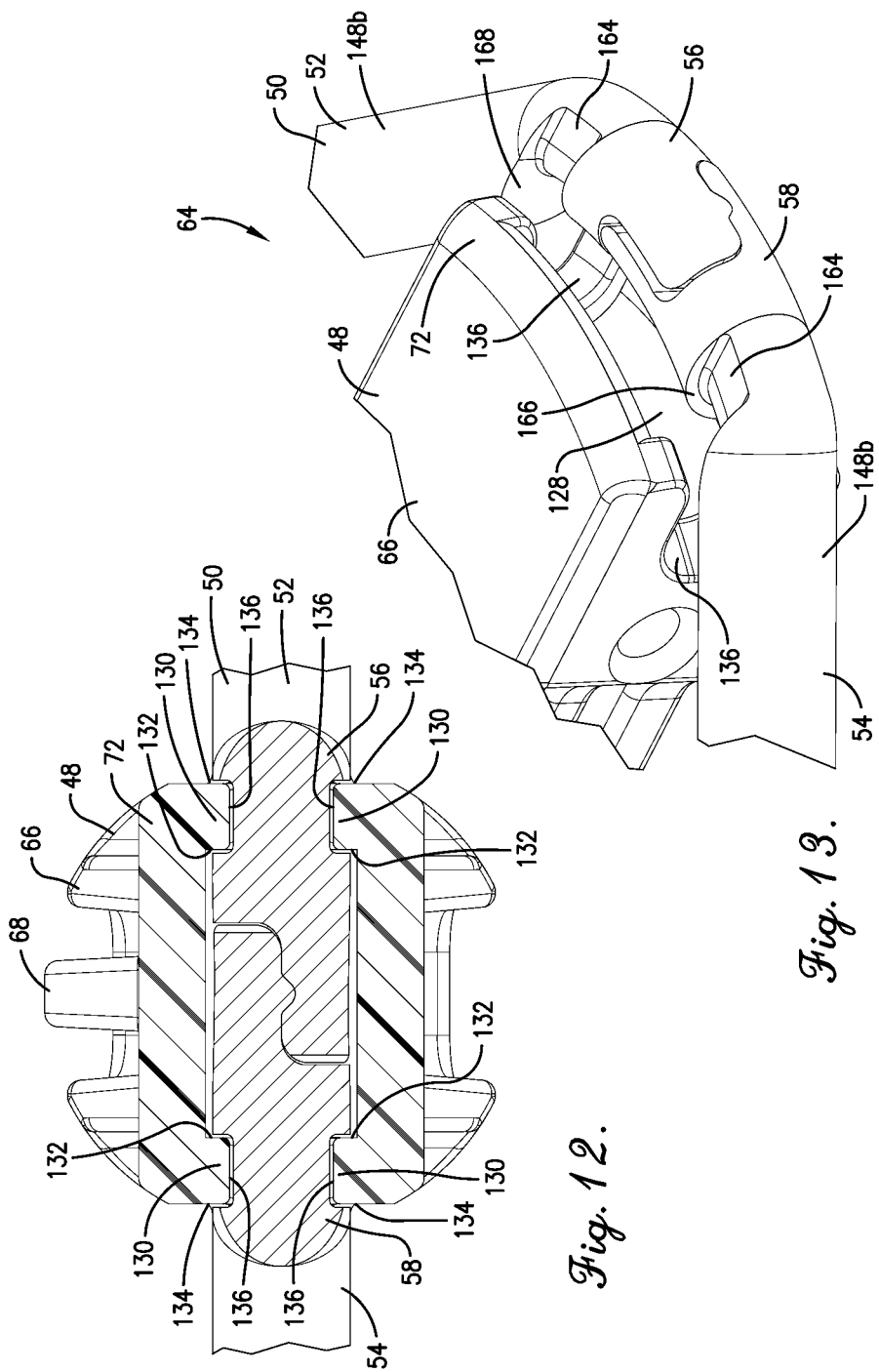

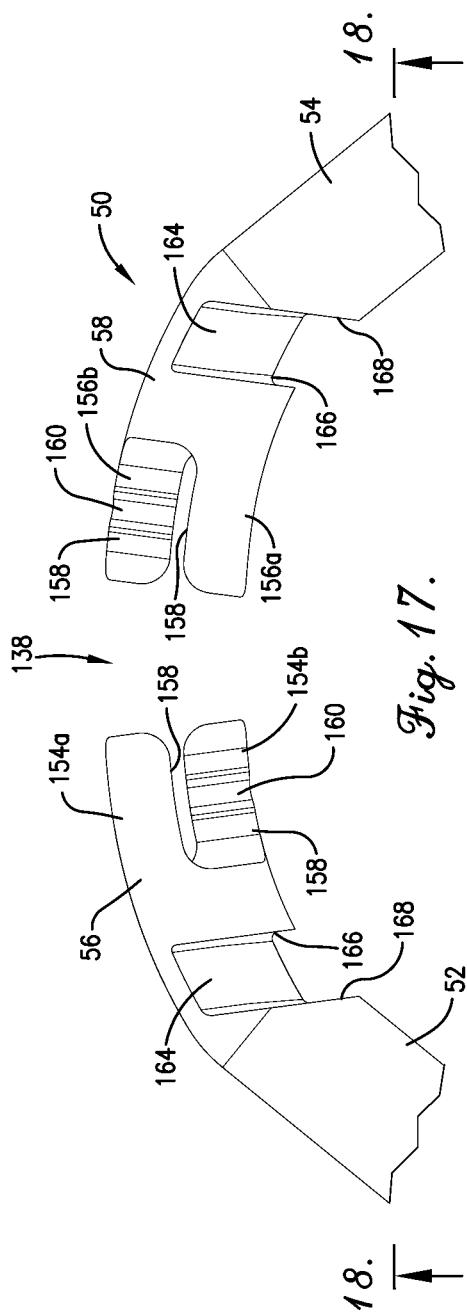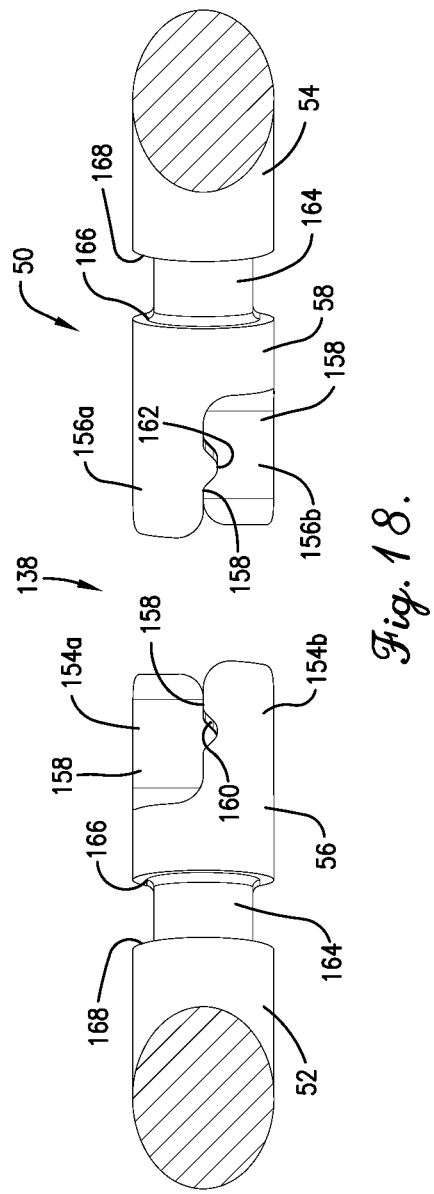

LOCKABLE CONNECTION DEVICE WITH CLOSED RING TO HOLD AN OBJECT, SUCH AS A KEY, DOG TAG, AND THE LIKE

RELATED APPLICATION

This application claims the benefit of U.S. Provisional Application Ser. No. 61/717,307, filed Oct. 23, 2012, entitled LOCKABLE CONNECTION DEVICE WITH CLOSED RING TO HOLD AN OBJECT, SUCH AS A KEY, DOG TAG, AND THE LIKE, and U.S. Provisional Application Ser. No. 61/755,320, filed Jan. 22, 2013, entitled LOCKABLE CONNECTION DEVICE WITH CLOSED RING TO HOLD AN OBJECT, SUCH AS A KEY, DOG TAG, AND THE LIKE, each of which is hereby incorporated in its entirety by reference herein.

BACKGROUND

1. Field

The present invention relates generally to connection devices. More specifically, the present invention concerns connection devices for holding objects, such as, for instance, keys or dog tags.

2. Discussion of Prior Art

Various types of ring-type connectors have long been employed to hold keys, tags, and other small objects for convenient storage and access. Such connectors typically include a circular, wire-type ring that can be selectively opened to permit an object to be added or removed from the ring. For instance, a conventional split ring is constructed of a single piece of spring metal wire that forms a double loop. The resilient spring metal resiliently urges each of the loops against one another and requires the user to flex open one of the ends of the loops to allow attachment or removal of an object relative to the ring. Conventional split ring connectors are difficult to pry open and often require the use of a tool or fingernail, which can lead to injury.

Some prior art ring-type connectors include a ring and a body that moves relative to the ring to selectively open and close the connector. However, conventional ring-type connectors have various deficiencies. For instance, such connectors have rings with exposed ends that can be inadvertently snagged or caught by an adjacent object. The exposed ends of conventional connectors can also be flexed such that the connector is unintentionally opened. For example, inadvertent contact between the exposed end and an adjacent object can cause the exposed end to flex and open the connector.

However, forces purposely applied to the connector can also cause inadvertent opening of the connector. For instance, a key or tag attached to the ring of the conventional connector can apply a pulling force to the ring such that the ring flexes to open the connector. This problem of unintended ring flexure is particularly acute when the pulling force is applied adjacent to the exposed end of the ring.

SUMMARY

The following brief summary is provided to indicate the nature of the subject matter disclosed herein. While certain aspects of the present invention are described below, the summary is not intended to limit the scope of the present invention.

Embodiments of the present invention provide a connection device that does not suffer from the problems and limitations of the prior art ring-type connectors set forth above.

A first aspect of the present invention concerns a connection device for holding an object, such as a key, dog tag, and the like. The connection device broadly includes a closed ring and a body. The closed ring has removably interconnected ends. The ring is configured to permit selective separation of the ends to define an opening therebetween that is configured to receive at least a portion of the object therethrough. The body is coupled with the ring at a connection location spaced from the ends. The ring presents a projecting ring portion defined between the connection location and a respective one of the ends, with the projecting ring portion cooperating with the body to define therebetween a space so as to accommodate the object. The body includes an end-engaging portion spaced from the connection location. The ends are engageable with the end-engaging portion of the body when interconnected to secure the object on the projecting ring portion. The ends are removable from engagement with the body so as to facilitate the separation of the ends.

A second aspect of the present invention concerns a connection device for holding an object, such as a key, dog tag, and the like. The connection device broadly includes a ring and a body. The ring has an end. The body is coupled with the ring at a connection location spaced from the end. The ring presents a projecting ring portion defined between the connection location and the end, with the projecting ring portion cooperating with the body to define therebetween a space so as to accommodate the object. The body includes an end-engaging portion spaced from the connection location. The end is engageable with the end-engaging portion of the body to secure the object on the projecting ring portion. The end extends along an axial direction of the ring. The end and the end-engaging portion of the body present complementally-shaped shoulders that extend at least substantially transverse to the axial direction. The shoulders operably contact one another when the end engages the end-engaging portion of the body to thereby restrict movement of the end away from the body along the axial direction.

A third aspect of the present invention concerns a connection device for holding an object, such as a key, dog tag, and the like. The connection device broadly includes a ring and a body. The ring has an end. The body is coupled with the ring at a connection location spaced from the end. The ring presents a projecting ring portion defined between the connection location and the end, with the projecting ring portion cooperating with the body to define therebetween a space so as to accommodate the object. The body includes an end-engaging portion spaced from the connection location. The end is engageable with the end-engaging portion of the body to secure the object on the projecting ring portion. The projecting ring portion includes ring sections that converge away from the body to an apex spaced from the end such that an object received on the projecting ring portion is urged toward the apex when pulled away from the body.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 5 is a top view of the connection device shown in FIGS. 1 and 2, with the ring and body in the closed condition, where the rings ends are interconnected with one another, and the ring ends are received by the end-engaging portion of the frame;

Figure 7:
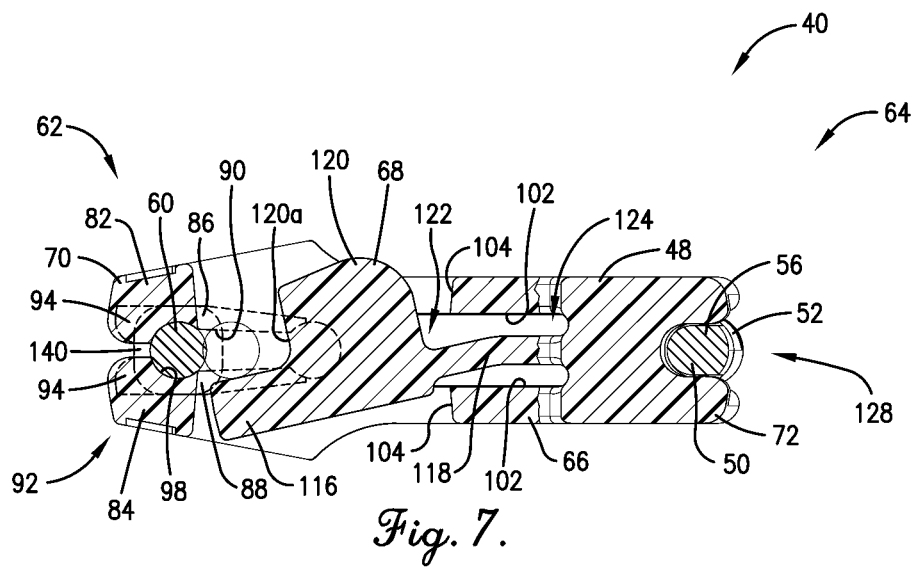
Figure 8:
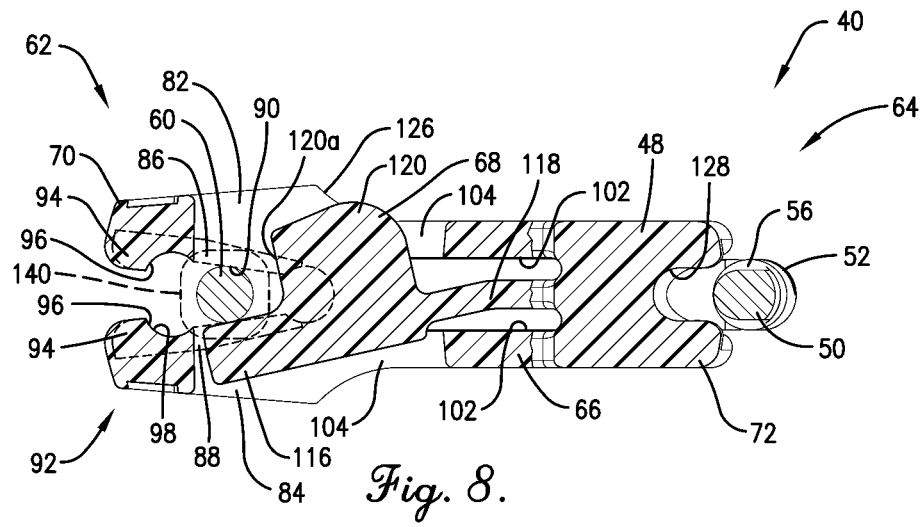
Figure 9:
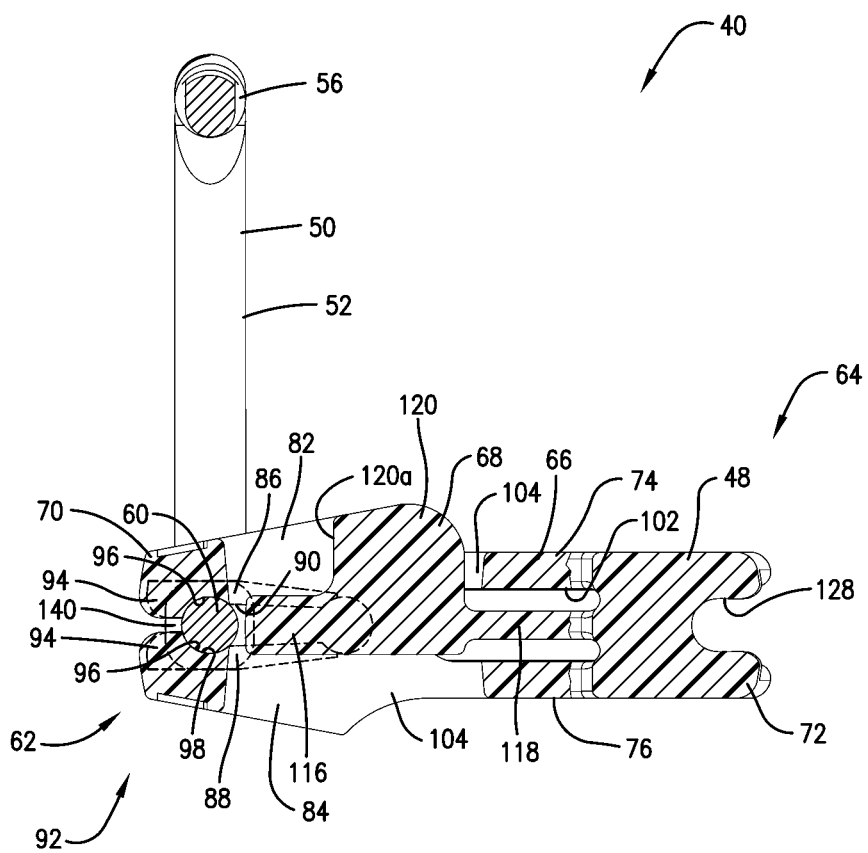
Figure 14:
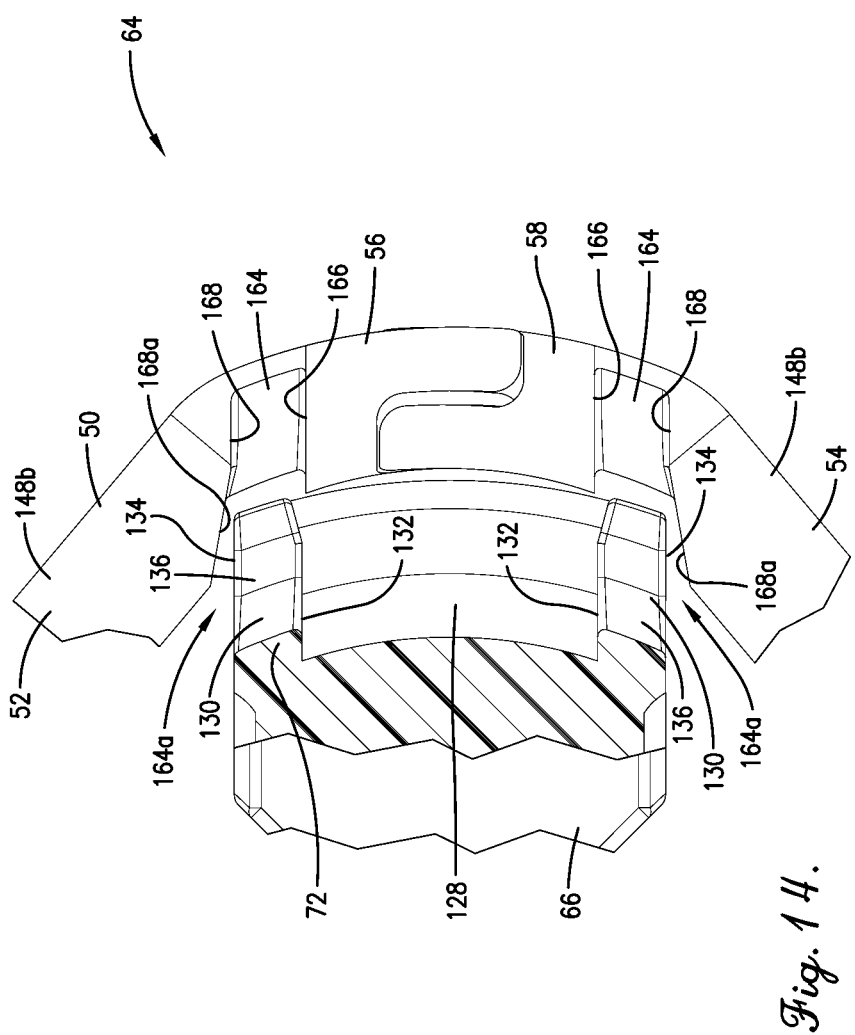
Figure 15:
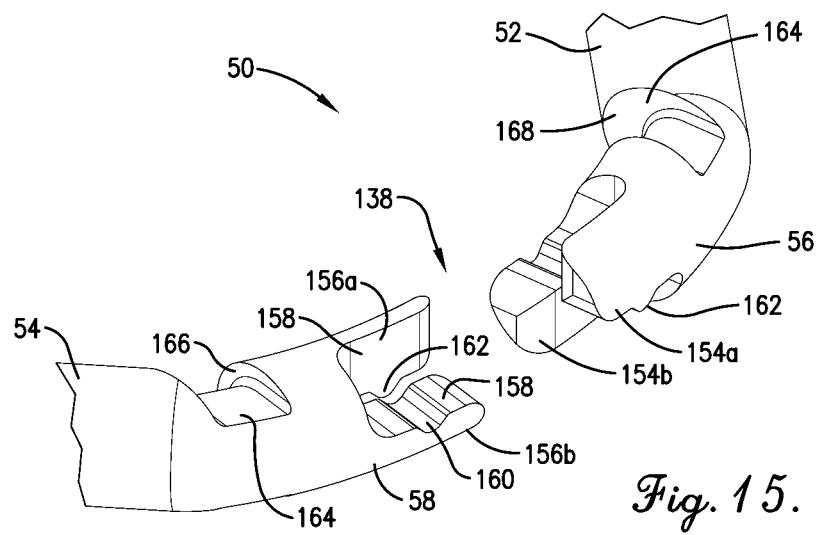
Figure 16:
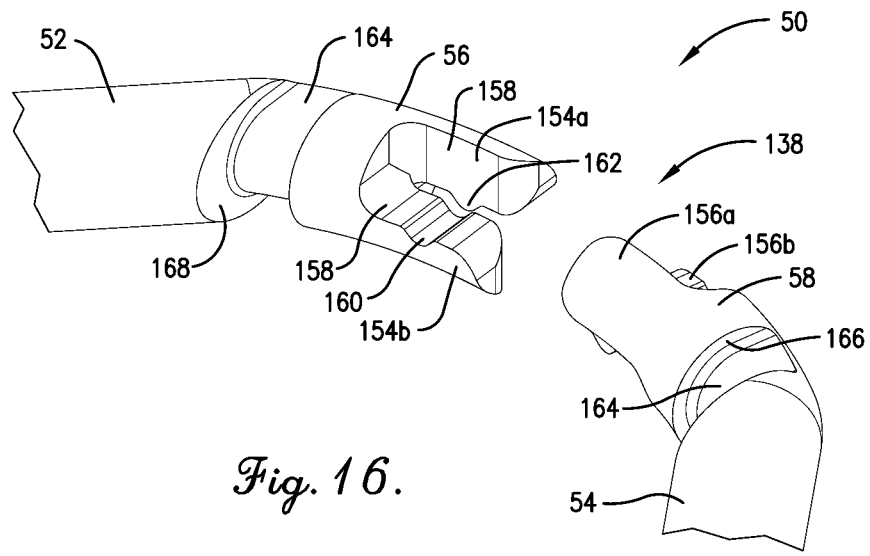

FIG. 6 is a cross section of the connection device taken along line 6-6 in FIG. 5, showing arms of the body spaced to define a slot therebetween that receives the hinge portion of the ring to provide a hinged connection, with the hinge portion located in a receiving groove at one end of the slot to define a first position of the hinged connection, and showing the locking member in a locked position to restrict movement of the hinge portion along the slot;

FIG. 7 is a cross section of the connection device similar to FIG. 6, but showing the locking mechanism shifted to an unlocked position and the hinged connection in the first position;

FIG. 8 is a cross section of the connection device similar to FIG. 7, but showing the ring shifted so that the hinge portion is spaced from the receiving groove to define a second position of the hinged connection, and the ring ends are spaced from the end-engaging portion;

FIG. 9 is a cross section of the connection device similar to FIG. 8, but showing the ring swung about the hinged connection so that the ring ends are spaced from the body, with the hinge portion being returned into engagement with the receiving groove;

FIG. 10 is a fragmentary perspective of the connection device shown in FIGS. 1, 2, and 5-9, showing the connection device in the closed condition, with the hinged connection being in the first position and the ring ends being received by the end-engaging portion;

FIG. 11 is a fragmentary top view of the connection device shown in FIGS. 1, 2, and 5-10, with the body partly cross-sectioned to show transverse grooves presented by the ring portions adjacent the ring ends, and showing the grooves being aligned with corresponding walls of the end-engaging portion;

FIG. 12 is a cross section of the connection device taken along line 12-12 in FIG. 11, showing shoulders of the walls and the grooves in engagement with one another;

FIG. 13 is a fragmentary perspective of the connection device similar to FIG. 10, but showing the ring shifted so that the ring ends are disengaged from the end-engaging portion of the body when the hinged connection is in the second position;

FIG. 14 is a fragmentary top view of the connection device in the condition depicted in FIG. 13;

FIG. 15 is a fragmentary perspective of the ring shown in FIGS. 1, 2, and 5-14, showing the ends separated from one another, with prongs defined at the ends including complemental locking surfaces that include notches and projections FIG. 16 is a fragmentary perspective of the ring similar to FIG. 15, but viewed from adjacent an opposite side of the ring;

FIG. 17 is a fragmentary top view of the ring in the condition shown in FIGS. 15 and 16; and FIG. 18 is a cross section of the ring taken along line 18-18 in FIG. 17.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
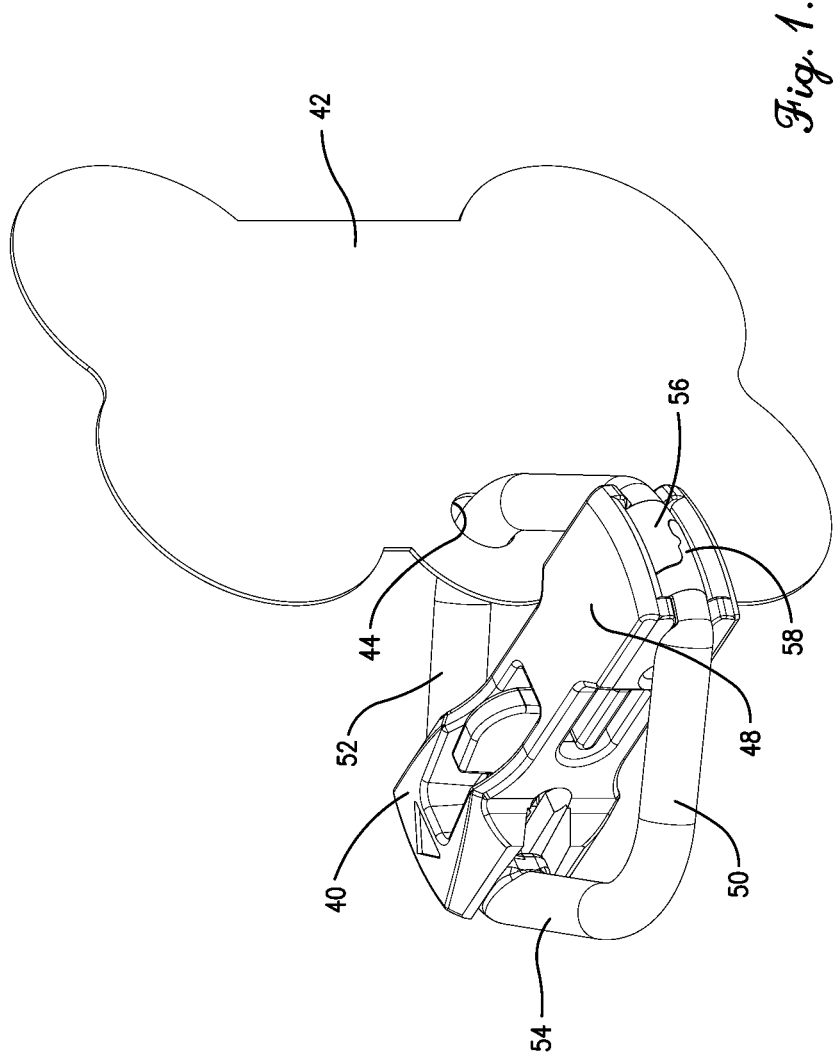
FIG. 1 is a perspective of a connection device constructed in accordance with a preferred embodiment of the present invention, showing the connection device in a closed condition and removably attached to a tag.
Figure 2:
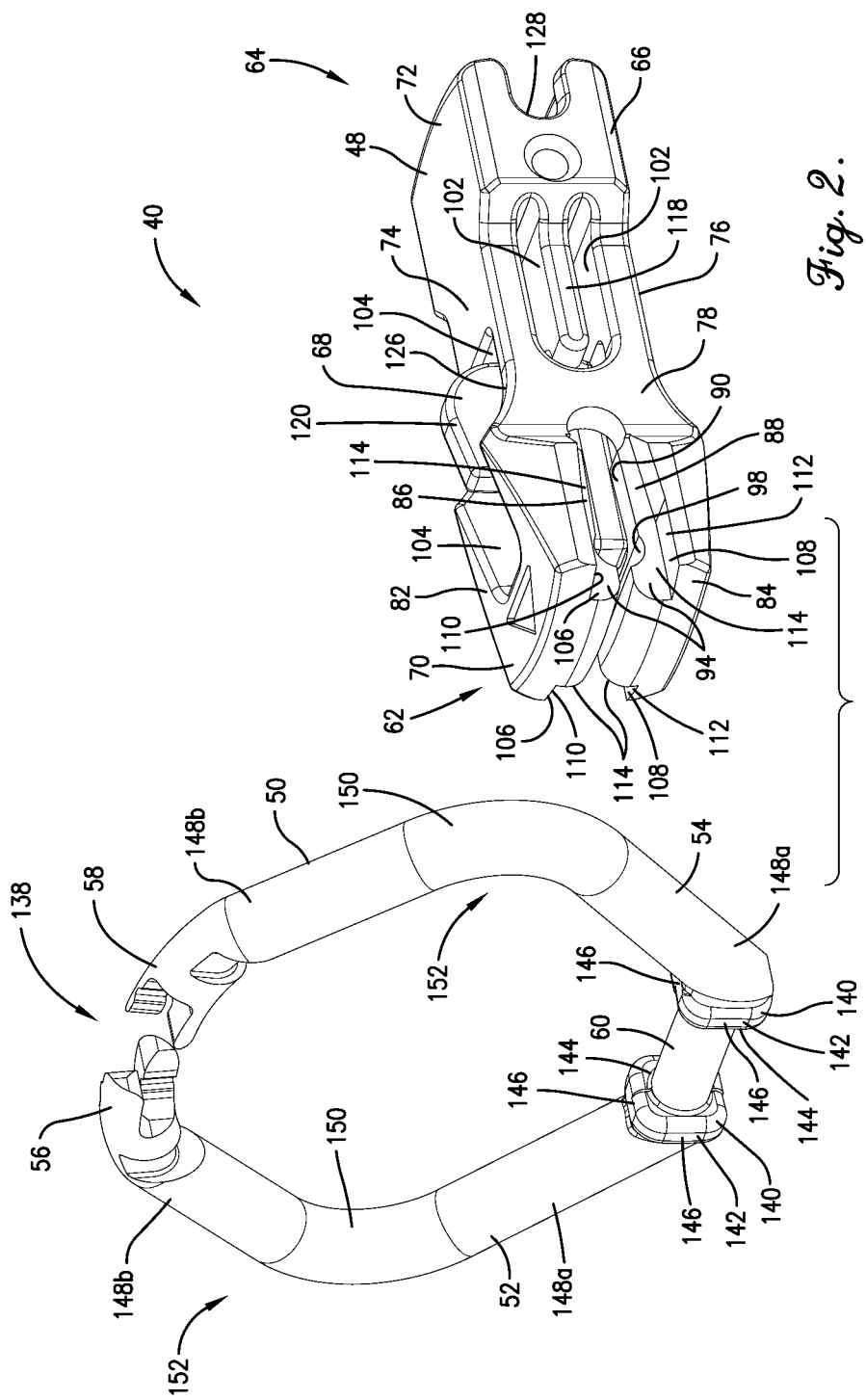
FIG. 2 is an exploded perspective of the connection device shown in FIG. 1, showing a body and a ring of the connection device, with the ring being flexed to separate the ring ends from one another.

Turning initially to FIGS. 1 and 2, a connection device 40 is constructed in accordance with a preferred embodiment of the present invention. The connection device 40, also referred to herein as connector 40, may hold various types of objects such as, for instance, keys, key fob tags, dog tags, or the like. The connector 40 shown in FIG. 1 is in a closed condition in which a dog tag 42 is retained thereon. The tag 42 is conventional and contains a through-hole 44 in a tab presented by the tag 42. The through-hole 44 is configured to receive the ring 50 therein to operatively interconnect the connector 40 and tag 42 together. The illustrated connector 40 broadly includes a body 48 and a ring 50.

The body 48 preferably bisects the ring 50 into two arcuate ring portions 52,54 that preferably terminate at respective ends 56,58 and extend from a ring hinge portion 60 (e.g., see FIG. 2). While the embodiments of the connector 40 shown herein involve a body 48 that bisects the ring 50, the connector 40 may alternatively include only a single ring portion extending from the body 48. Furthermore, the principles of the present invention are likewise applicable to a body 48 that does not bisect the ring (e.g., the body 48 could alternatively be offset so as to be positioned closer to one side of the ring 50 than the other). Also, while the ring portions 52,54 are preferably identically sized and shaped, the ring portions 52,54 could be different from one another. However, in the disclosed embodiments, each respective ring portion 52,54 is preferably capable of retaining at least one object thereon.

Turning to FIGS. 2-6, the illustrated body 48 is generally elongated along an axis A and presents opposite ends 62,64 (see FIG. 5). The body 48 preferably includes a frame 66 and a locking mechanism 68, with the frame 66 including a hinge portion 70 and an end-engaging portion 72. As will be discussed in greater detail, the hinge portion 70 of the body 46 receives the hinge portion 60 of the ring 50 to cooperatively define a connection location. Similarly, the end-engaging portion 72 is configured to receive the ends 56,58 of the ring 50. The body 48 also presents a top surface 74, bottom surface 76, and opposite sides 78 that extend between the ends 62,64.

The hinge portion 70 of the body 48 preferably includes two arms 82,84 that are integrally formed as part of the body 48. The illustrated arms 82,84 include opposing side walls 86,88 that cooperatively define a slot 90 therebetween. The slot 90 is configured to receive the hinge portion 60 of the ring 50, with the hinge portion 60 of the ring 50 and the arms 82,84 cooperatively forming a hinged connection 92 between the body 48 and ring 50. As will be discussed, the hinged connection 92 is preferably configured so that the hinge portion 60 of the ring 50 is slidable and rotatable therein, although this connection location could be alternatively configured without departing from the scope of the present invention.

Figure 3:
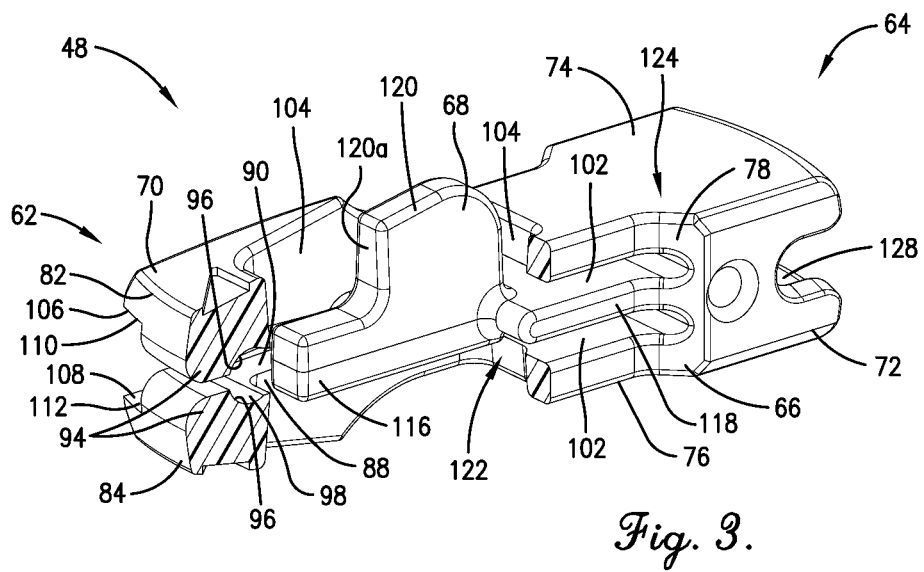
FIG. 3 is a perspective of the body shown in FIG. 2, showing a frame and a locking mechanism of the body, with the frame being cross-sectioned to illustrate a bias member, locking member, and actuator of the locking mechanism.
Figure 4:
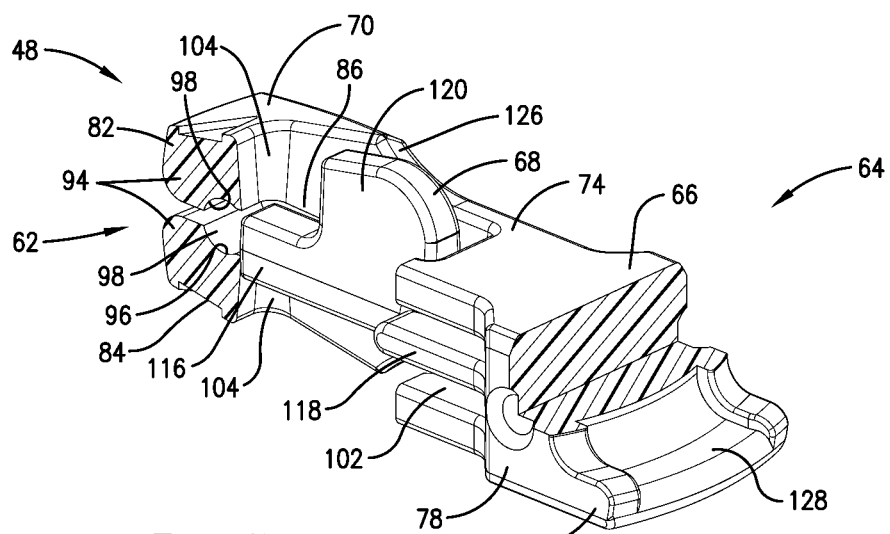
FIG. 4 is a perspective of the body similar to FIG. 2, but viewed from adjacent an opposite end of the body, showing the frame cross-sectioned along an end-engaging portion thereof, with the end-engaging portion including spaced apart walls and an interior groove that extends between the walls.

As shown in FIGS. 3 and 4, the slot 90 is preferably open-ended, but other embodiments may include a body 48 having a closed-ended slot. The arms 82,84 preferably include opposing end walls 94 that substantially enclose the end of the slot 90 to restrict the hinge portion 60 of the ring 50 (see FIGS. 5 and 6) from being urged out of the slot 90. The end walls 94 preferably present interior shoulders 96 that partly define a receiving groove 98 (see FIGS. 3 and 4), which receives the hinge portion 60 of the ring 50 (see FIG. 6).

As shown in FIG. 6, the receiving groove 98 is preferably formed adjacent one end of the slot 90 to receive the hinge portion 60 of the ring 50 at a first location 100 corresponding to a first position of the hinged connection 92. This position of the hinged connection 92 corresponds with the closed condition of the connector 40 (assuming the ring ends 56,58 (see FIGS. 10 and 11) have been aligned with the recess presented by the end-engaging portion 72). As will be shown, the hinge portion 60 of the ring 50 is preferably slidable along the slot 90 out of the first position toward the end-engaging portion 72 (see FIG. 8) and into a second position. As will be discussed, the arms 82,84 are resiliently flexed when the ring 50 is received therebetween, which urges the hinge portion 60 to remain in the receiving groove 98. Also, the side walls 86,88 are preferably shaped so that the width of the slot 90 tapers away from the receiving groove 98. The tapered slot 90 cooperates with the urging action provided by the flexed walls 86,88 to guide and bias the hinge portion 60 toward the receiving groove 98. It is also noted that the receiving groove 98 is preferably in the form of a detent, which is matched to the shape and size of the hinge portion 60 of the ring 50. Therefore, the hinge portion 60 of the ring 50 is snugly retained in the receiving groove 98.

The frame also preferably presents a cavity 102 (see FIGS. 3, 4, 7, and 8) that extends laterally between the sides 78 (see FIGS. 3-5) and is located between the ends 62,64. The cavity 102 communicates with top and bottom openings 104 in the body 48, with the cavity 102 and openings 104 cooperatively receiving the locking mechanism 68. Additional details of a similarly constructed connector body 48 are described in U.S. Publication No. 2011/0314879, published Dec. 29, 2011, entitled CONNECTION DEVICE FOR HOLDING AN OBJECT, SUCH AS A KEY, DOG TAG, AND THE LIKE, which is hereby incorporated in its entirety by reference herein.

Referring to FIGS. 2-8, the arms 82,84 further include oppositely facing channels 106,108 located along sides 78 adjacent to the slot 90. The channels 106,108 are formed by upper channel surfaces 110 and lower channel surfaces 112 running at least a portion of the length of the slot 90. The channels 106,108 further include outwardly facing shoulders 114. The upper channel surfaces 110, lower channel surfaces 112, and shoulders 114 are each preferably at least partially planar and flat. Preferably, the upper surfaces 110 and lower surfaces 112 converge away from the receiving groove 98 (see FIGS. 2-4 and 6), thereby providing a taper to the channel 106,108, which further enhances urging of the hinged connection 92 (see FIGS. 6-8) to the first position. As will be described, respective ring projections are received within the channels 106,108 to provide indexing and alignment of the ring 50 relative to the body 48.

Turning to FIGS. 2-4 and 6-7, the preferred locking mechanism 68 generally includes a lock member 116 configured to engage the hinge portion 60 of the ring 50, a bias member 118 yieldably biasing the lock member 116 into a locked position, and an actuator 120 for providing manual operation of the locking mechanism 68.

Preferably, the locking mechanism 68 is integrally formed as part of the body 48. However, it is within the ambit of the present invention where the locking mechanism 68 is separately formed and later assembled with the frame 66.

A cantilevered end 122 of the bias member 118 is attached to and carries the lock member 116. The illustrated bias member 118 is attached to and projects from the frame 66 at a supported end 124 adjacent the end-engaging portion 72 within the cavity 102 to provide a cantilevered spring.

The resiliency of the cantilevered bias member 118 preferably maintains the lock member 116 in a locked position, with flexing of the bias member 118 permitting the lock member 116 to shift out of the locked position and into an unlocked position (see FIG. 7). While preferred embodiments of the connector 40 described herein preferably use a cantilevered spring, those of skill in the art will readily recognize that other devices, such as an alternative mechanical spring, an electro-mechanical switch, or a magnetic device may be employed to provide a biasing force for use in the locking mechanism 68.

The actuator 120 projects from the bias member 118 at a location spaced from the supported end 124. When the actuator 120 is pushed by a user, the bias member 118 and the lock member 116 are shifted, causing resilient flexing of the bias member 148. It is understood, however, that the actuator 120 may operably be located elsewhere on the body 48 or be otherwise alternatively configured.

The actuator 120 preferably projects above the top surface 74 of the body 48 through the opening 104 in the body 48, such that a user can access the actuator 120 to disengage the locking mechanism 68. In particular, the user can depress the actuator 120 to shift the locking mechanism 68 from the locked position to the unlocked position.

Each of the top and bottom surfaces 74,76 preferably includes a sloped face 126 adjacent the actuator 120. The faces 126 are preferably shaped to be engaged by the user's fingers when the body 48 is grasped by the user. The sloped face 126 of the top surface 74 is also preferably shaped to act as a stop to limit the amount of travel caused by depressing the actuator 120. In this manner, the sloped face 126 restricts the actuator from being depressed to the extent of damaging the locking mechanism 68. In addition, once the lock member 116 is shifted out of the slot 90 so as to no longer block movement of the ring 50 within the slot 90, the end face 120a (see FIGS. 6-8) prevents the ring 50 from moving to the end of the slot 90 (opposite the receiving groove 98). This prevents the second position of the hinged connection from overflexing the arms 82,84 or otherwise damaging the body 48. Additional details of a connector body with a similar hinge portion are described in the above-incorporated '879 publication.

Turning to FIGS. 10-14, the frame 66 preferably includes the end-engaging portion 72, which is spaced from the connection location (cooperatively defined by the interconnected hinge portions 60 and 70 (see FIGS. 6-8) of the ring 50 and body 48, respectively). The end-engaging portion 72 preferably presents a recess 128 and includes spaced-apart transverse walls 130 within the recess 128. The walls 130 present interior and exterior shoulders 132,134 and slotted openings 136 (see FIGS. 12 and 14). Thus, as will be discussed, the end-engaging portion 72 is configured to slidably receive the ends 56,58 of the ring 50. However, it is within the ambit of the present invention where the end-engaging portion 72 is alternatively configured to receive and engage the ring 50.

The body 48 is preferably formed of a synthetic resin material that is yieldably resilient. More preferably, the body 48 includes a polymer material that includes a lubricant. However, other suitable materials and fabrication techniques can be used to make the body 48 without departing from the spirit of the present invention. For example, the body 48 could alternatively be machined or cast of metal or a composite material.

Turning to FIGS. 2 and 5, the illustrated ring 50 is preferably unitary and includes ring portions 52,54 and hinge portion 60. The ring 50 also includes ends 56,58 that are removably interconnected so that the ring 50 is normally closed. As will be explained, the ends 56,58 are preferably snapped into engagement with one another. The ring 50 therefore preferably presents a substantially endless shape. However, for some aspects of the present invention, the ring 50 could be alternatively configured to present an open ended ring shape. For instance, the ring ends 56,58 could be normally spaced apart from one another (e.g., where the ring portions 52,54 are alternatively sized or configured). Yet further, the ring 50 could be devoid of one of the ring portions 52,54 (e.g., where the connector 40 provides only a single space between the ring 50 and body 48).

The illustrated ring 50 is preferably yieldably flexible so that the ends 56,58 can be selectively separated from one another in a separating direction to define an opening 138 (see FIGS. 2 and 15-18). In particular, the ring portions 52,54 can be pulled away from each other to yieldably and resiliently flex the ring 50 and thereby separate the ends 56,58 from one another. The yieldable flexing of the ring 50 preferably causes the ring 50 to urge the separated ends 56,58 back into engagement with one another.

For some aspects of the present invention, the ring 50 could be alternatively configured to allow the ends 56,58 to be selectively separated from one another. For instance, the ring could include a hinge joint that pivotally connects portions of the ring 50. In such an alternative embodiment, one or both of the ring portions 52,54 could be pivotally connected to the hinge portion 60 (e.g., to swing about an axis perpendicular to the hinge portion 60 and to the axis A of the body 48). Yet further, the hinge portion 60 could itself define a pivot so that the ring portions 52,54 are swingably interconnected.

In yet another alternative connector configuration, the ring 50 could include ring portions 52,54 that are independently shiftably attached to the body 48, with the corresponding ring ends 56,58 being independently shiftable into and out of engagement with the end-engaging portion 72.

According to certain aspects of the present invention, the ring 50 is formed of any suitable material capable of flexing (without requiring undue manually-exerted forces) to permit separation of the ring ends 56,58. Particularly, the ring 50 is preferably formed of a synthetic resin. More preferably, the ring 50 is formed of an acetal polymer, such as that available from DuPont under the registered trademark DELRIN®. Most preferably, the ring material includes a lubricant (e.g., silicon) to enhance sliding movement of the ring 50 relative to the body 48. However, other suitable materials and fabrication techniques can be used to make the ring 50 without departing from the spirit of the present invention. For example, the ring 50 could alternatively be machined or cast of metal or a composite material.

The ring 50 preferably flexes to size the opening 138 so as to accommodate the addition and removal of various objects sought to be retained on the connector 40. The opening 138 preferably provides access to the connector 40 by permitting objects to be received onto either respective ring portion 52,54 when the connector 40 is in an open condition. Similarly, when an object retained on the connector 40 is to be removed, the object will be removed through the opening 138.

It has been determined that forming the ring 50 of the synthetic resin provides several notable unexpected advantages. For example, the preferred use of synthetic resin makes the connector 90 lightweight and corrosion resistant. Furthermore, the preferred ring material reduces noise that might otherwise occur if the ring is formed of metal and is used to support a metal object. In addition, the preferred material is less susceptible to temperature variation, remaining comfortable to touch in cold or hot environments.

The hinge portion 60 preferably comprises a straight section of the ring 50 to permit relative shifting movement between the ring 50 and the body 48. Again, the hinge portion 60 is preferably located between the ring portions 52,54. Although the hinge portion 60 is preferably opposite the ends 56,58, the hinge portion 60 may be located elsewhere along the ring 50. The hinge portion 60 is operable to be rotatably received by the body 48 so that the ring 50 may be swung about the hinge portion 60. As discussed, the hinge portion 60 is also operable to be slidably received by the body 48.

Turning to FIG. 2, the ring 50 also preferably includes projections 140 between the hinge portion 60 and the ring portions 52,54. In the illustrated embodiment, each of the ring projections 140 is located at an end of the hinge portion 60 and between the hinge portion 60 and the corresponding ring portion 52,54. However, the projections 140 may be alternatively situated without departing from the scope of the present invention. The ring projections 140 each present a circumferential indexing surface 142 and opposite radially extending interior shoulders 144. The indexing surface 142 of each of the projections 140 is preferably faceted and presents a plurality of faces 146.

The shoulders 144 of the projections 140 are preferably oppositely facing and substantially perpendicular to the circumferential surface 142 of the ring 50. However, it is within the ambit of the present invention where the shoulders 144 are not perpendicular to the circumferential surface 142. Instead, the projections 140 could take alternative forms that project radially from the adjacent hinge portion 60 to present shoulders 144. As will be shown, the shoulders 140 cooperate with the body 48 to prevent relative sliding of the body 48 along the axis of the ring 50. The shoulders 140 also cooperate with the body 48 to define indexed angular positions of the ring 50 relative to the body 48.

The hinge portion 60 and projections 140 are depicted herein as being integrally formed as part of the ring 50. However, other constructions may suitably meet the objects of the present invention, such as, for instance, a non-integral hinge portion 60. Additional details of an alternative ring 50 having a hinge portion and projections are described in the above-incorporated '879 publication.

Turning again to FIGS. 2 and 5, the illustrated ring portions 52,54 preferably include straight sections 148a,b and a curved central section 150 located between the straight sections 148. The straight sections 148 preferably converge to the curved central section 150, with the central section 150 defining an apex 152.

In the illustrated embodiment, the straight sections 148a,b of each ring portion 52,54 preferably define an angle B (see FIG. 5) that ranges from about ninety degrees (90°) to about one hundred fifty degrees (150°). More preferably, the angle B ranges from about ninety degrees (90°) to about one hundred twenty degrees (120°). However, the straight segments could be alternatively shaped and/or arranged relative to the central section 150.

Also, while the central section 150 is preferably curved, the central section 150 could be alternatively shaped without departing from the scope of the present invention. For instance, the central section 150 could present a sharp angled corner that provides the apex 152. Yet further, the central section 150 could be substantially straight. As will be discussed, the ring portions 52,54 are shaped to urge the tag 42 toward the apex 152 when the tag 42 is pulled away from the body 48.

The ring portions 52,54 preferably have substantially the same shape. However, the ring portions 52,54 could be differently shaped without departing from the scope of the present invention. Yet further, the ring portions 52,54 could be formed in various shapes (e.g., to urge the tag 42 towards a corresponding apex when the tag 42 is pulled away from the body 48). Additional details of suitable alternative ring portion shapes are disclosed in the above-incorporated '307 and '320 provisional applications.

Turning to FIGS. 10-18, the ring ends 56,58 are preferably removably interconnected so that the ends 56,58 can be selectively separated from one another. The ends 56,58 are preferably constructed so that the ends snap into and out of engagement with one another. That is, the act of bringing the ends 56,58 into and out of engagement with one another results in a snapping action of the ends 56,58 that can be sensed by a user (e.g., where the user can feel and/or hear the ends 56,58 snapping into and out of engagement with one another).

Each of the illustrated ring ends 56,58 is preferably curved to define an arcuate portion of the ring longitudinal axis. When interconnected, the ring ends 56,58 define a common direction along which the ring ends 56,58 project toward one another. In the illustrated embodiment, the common direction is aligned with the axial direction of the ring 50 when the ring ends 56,58 are interconnected. However, for some aspects of the present invention, the ring 50 could be devoid of one of the ring ends 56,58. For instance, the connector 40 could be configured with only a single ring portion located on one side of the body 48 so that the connector 40 provides only a single space between the ring 50 and body 48. Furthermore, for some aspects of the present invention, the ring ends 56,58 could be offset from one another so as not to be connectable. In such an arrangement, the offset ring ends would extend along respective individual axes that are not aligned.

The ring end 56 preferably includes a pair of prongs 154a,b, and the ring end 58 preferably includes a complemental pair of prongs 156a,b (see FIGS. 15-18). The illustrated prongs 154,156 extend along an axial direction of the ring 50 and present locking surfaces 158. The locking surfaces 158 preferably define a notch 160 and a projection 162 that are complementally shaped. When the ends 56,58 are interconnected, each notch 160 receives a complementally shaped one of the projections 162. The illustrated notches 160 and projections 162 are preferably generally transverse to the axial direction of the ring 50. Thus, because the axial direction of the ring 50 extends along (but not necessarily parallel to) the separation direction associated with the ends 56,58, the notches 160 and projection 162 cooperatively restrict separation of the ends 56,58.

However, it is within the ambit of the present invention where the notches 160 and projections 162 are alternatively shaped and/or positioned to provide frictional engagement between the ends 56,58. For instance, each of the ends 56,58 could have an alternative number of notches 160 and/or projections 162. Also, the ends 56,58 could be configured so that one of the ends 56,58 has only a notch 160 and the other end 56,58 has only a projection 162. Yet further, the notches 160 and projections 162 could be alternatively positioned on the prongs 154,156.

As discussed above, the ends 56,58 are preferably constructed so that the ends snap into and out of engagement with one another. In the illustrated embodiment, a first pair of prongs 154a,156b have a corresponding notch 160 and projection 162 that releasably engage one another. Similarly, a second pair of prongs 154b,156a have a corresponding notch 160 and projection 162 that releasably engage one another. As the first and second pairs of prongs 154,156 are brought into and out of engagement with one another, the corresponding notches and projections 162 preferably produce a snapping action of the prongs 154,156 that can be sensed by a user. Again, the user may be able to feel and/or hear the ends 56,58 snapping into and out of engagement with one another.

The illustrated prongs 154,156 are preferably shaped and positioned so that the ends 56,58 are complementally shaped, with the locking surfaces 158 being in frictional engagement with one another to cooperatively hold the ends 56,58 in removable interlocking engagement. However, the prongs 154,156 could be alternatively configured to provide removable interlocking engagement of the ends 56,58. For instance, the prongs 154,156 could alternatively overlap one another along the axial direction of the ring 50 (e.g., where a first one of the ends 56,58 presents two prongs and a second one of the ends 56,58 presents a single prong received between the two prongs of the first end). Yet further, each end 56,58 could include a single prong, with each prong having a catch that engages the other prong. It is also possible for the prongs 154,156 to present a ball-and-socket type connection wherein one of the prongs 154,156 is partly received in the other.

Turning to FIGS. 10-14 and 17-18, the ring portions 52,54 each preferably present transverse grooves 164 adjacent the corresponding ring ends 56,58. Each transverse groove 164 preferably extends substantially transversely to the separating direction of the ring ends 56,58. Each groove 164 presents opposed interior and exterior groove shoulders 166,168. The shoulders 166,168 also preferably extend substantially transversely to the separating direction. Also, because the axial direction of the illustrated ring 50 extends along (but not necessarily parallel to) the separation direction associated with the ends 56,58, shoulders 166,168 also preferably extend substantially transversely to the axial direction of the ring 50. As will be discussed, the grooves 164 are configured to receive corresponding walls 130 of the end-engaging portion 72 so that the groove shoulders 166, 168 engage corresponding shoulders 132,134 presented by the walls 130.

It is noted that the grooves 164 preferably each have a widened mouth 164a (see FIGS. 11 and 14). Preferably, the mouth 164a progressively opens because of the angular orientation of the wall 168a. This wall 168a is most preferably at a ten degree (10°) angle. It will be appreciated that the widened mouth 164a facilitates positioning of the grooves 164 on the walls 130 when the hinged connection 92 is returned to the first position.

In the closed condition, the illustrated ring 50 and body 48 preferably provide a connector 40 with a pair of ring portions 52,54 and corresponding spaces defined along the ring portions 52,54 on opposite sides of the body 48. However, as previously noted, for some aspects of the present invention, the ring 50 could be devoid of one of the ring portions 52,54. For instance, the connector 40 could be configured with only a single ring portion located on one side of the body 48 so that the connector 40 provides only a single space between the ring 50 and body 48.

Turning to FIGS. 2 and 9, the ring and body of the illustrated connector 40 can be selectively attached by inserting the hinge portion 60 of the ring 50 into the hinge portion 70 of the body 48. In particular, the hinge portion 60 of the ring 50 is inserted into slot 90 by first passing the hinge portion 60 through the open-ended slot 90 and past the end walls 94 of the arms 82,84. The arms 82,84 preferably apply a resilient flexing force against the hinge portion 60 so that the ring 50 must be urged past the end walls 94 and into the slot 90 with an appreciable force. Once the resilient flexing force of the arms 82,84 is overcome, the hinge portion 60 of the ring 50 passes the end walls 94 and is seated within the slot 90 along the receiving groove 98.

The arms 82,84 are preferably resiliently flexed when the hinge portion 60 is received therebetween. In this manner, the arms 82,84 frictionally engage the hinge portion 60 and urge the hinge portion 60 to remain in the receiving groove 98 (see FIGS. 6-8). As previously noted, because the walls defining the slot 90 converge toward the end-engaging portion 72 (and with the arms 82,84 being resiliently flexed), the ring 50 is urged toward the receiving groove 98 whenever it has been shifted out of the first position, which facilitates closing of the connector 40. At the same time, the illustrated connection also preferably permits relative swinging between the ring 50 and the body 48. However, for some aspects of the present invention, the connector 40 may be alternatively configured so as to prevent relative swinging between the ring 50 and the body 48 (e.g., where the ring 50 is fixed to the body 48 along the hinge portion 60).

If it is desired to completely separate the ring 40 from the body 48, the hinge portion 60 can be removed from engagement with the arms 82,84 (assuming that the ends 56,58 are out of engagement with the end-engaging portion 72). In particular, the ring 50 can be removed from the body 48 by forcing the hinge portion 60 of the ring 50 against the interior shoulders 96 presented along the end walls 94 to urge the end walls 94 away from one another. Once the yieldable retaining force of the arms 82,84 is overcome, the hinge portion 60 passes between the end walls 94 and is released from the slot 90.

Again, the side walls 86,88 are preferably shaped so that the width of the slot 90 tapers away from the receiving groove 98. Thus, the tapered slot 90 cooperates with the force applied by the flexed side walls 86,88 to guide and bias the hinge portion 60 of the ring 50 along the slot 90 toward the receiving groove 98.

When the hinge portion 60 is inserted into the slot 90 between the arms 82,84, the shoulders 114 of the channels 106,108 cooperatively engage the interior shoulders 144. In particular, the shoulders 114 interengage with the shoulders 144 to restrict the body 48 from slidably moving along the axis of ring 50. Additional details of interconnecting hinge portions of a similar ring and body and their interconnection are disclosed in the above-incorporated '879 publication and the above-incorporated '307 and '320 provisional applications. Faces 146 cooperate with faces 110,112 to define indexed angular positions as the body 48 and ring 50 are swung relative to one another.

In FIG. 6, the lock member 116 is shown in the locked position, wherein the lock member 116 is positioned in the slot 90 in a blocking relationship with the hinge portion 60. The lock member 116 is configured to engage the hinge portion 60 if the hinge portion 60 is urged along the slot 90 away from the open end thereof. In this manner, the lock member 116 is configured to selectively prevent the hinge portion 60 from moving out of the first location within the receiving groove 98 of the slot 90.

As depicted in FIG. 7, the actuator 120 may be manually pressed to shift the lock member 116 against the bias of the bias member 118. Once the lock member 116 has moved sufficiently out of the locked position to no longer block movement of the ring hinge portion 60 within the slot 90, the hinge portion 60 may be moved out of the first location (e.g., see FIG. 7). Thus, the hinge portion 60 of the ring 50 is preferably slidable along the slot 90 out of the first position toward the end-engaging portion 72 and into the second position (see FIG. 8).

However, for some aspects of the present invention, the connector 40 could be configured so that the hinge portion 60 is not slidable out of the first position toward the end-engaging portion 72 (e.g., where the ring 50 can only swing relative to the body 48 when located within the receiving groove 98). Yet further, the connector 40 could be configured so that the ring 50 is fixed to the body 48 (e.g., where the ring 50 is fixed to the body 48 along the hinge portion 60). Additional details of a similar locking mechanism to selectively control shifting the ring 50 into and out of the first position within the receiving groove 98 are disclosed in the above-incorporated '879 publication.

In the preferred embodiment, when the hinged connection 92 is moved to the second position (i.e., the ring hinge portion 60 is moved along the slot 90 away from the groove 98), the body 48 no longer prevents relative swinging of the ring 50. This is accomplished because the ring ends 56,58 are shifted out of the recess 128 and away from the body 48.

With the hinged connection 92 in the first position (see FIGS. 6 and 8), the interconnected ends 56,58 are selectively shifted into engagement with the end-engaging portion 72 of the body 48 (see FIG. 6). Again, the actuator 120 is pressed to unlock the locking mechanism 68 so as to permit the ring 50 to shift out of the first position and into the second position (see FIGS. 8, 13, and 14). This permits the ring 50 to be swung relative to the body 48 so that the ends 56,58 are moved out of alignment with the recess 128. The locking mechanism 68 may then be released and the hinged connection 92 will be urged back into the first position (with the ring hinge portion 60 in the groove 98), as shown in FIG. 9. The ring 50 is freely swingable relative to the body 48, with the projections 140 urging the ring into indexed angular positions relative to the body 48.

When it is desired to return the connector 40 to the closed condition (see FIG. 1), the ring 50 is swung so that the ends 56,58 are aligned with the recess 128. This requires the lock to be actuated so that the ends 56,58 can move past the end-engaging portion 72 of the body 48. Once the ends 56,58 are in alignment with the recess 128, the locking mechanism 68 may be released and the ring 50 is urged to return to the first position. The interconnected ends 56,58 slide along the axis A into engagement with the recess 128 so that the connector 40 is in the closed condition (see FIGS. 6, 10, 11, and 12). It will be appreciated that the interconnection between the ends 56,58 (and the consequential secure positioning and location of each) ensures that the grooves 164 are properly aligned with and received on the walls 130. At the same time, the grooves 164 presented by the ring portions 52,54 preferably engage corresponding walls 130. The walls 130 present shoulders 132,134 that extend substantially transversely to the separating direction associated with the ends 56,58 and are substantially aligned with corresponding shoulders 166,168. As a result, the interior shoulders 132 come into engagement with corresponding interior shoulders 166 of the grooves 164. Similarly, the exterior shoulders 134 come into engagement with corresponding exterior shoulders 168 of the grooves 164. In this manner, the walls 130 and grooves 164 cooperatively restrict movement of the ends 56,58 relative to the body 48 and relative to one another.

Again, as described above, the ring 50 could be devoid of one of the ring portions 52,54 without departing from the scope of the present invention. For instance, the connector 40 could be configured with only one of the ring portions 52 or 54 so that the connector 40 provides only a single space between the ring 50 and body 48. In such an alternative embodiment, it may still be desirable to provide shoulders (such as those defined by the groove 164 and wall 130) to secure the single end to the body 48.

Yet further, as described above, the ring 50 could include ring portions 52,54 that are independently shiftably attached to the body 48. In such an alternative embodiment, the groove associated with each independently shiftable ring portion 52,54 would be independently shifted into and out of engagement with the corresponding wall 130. Additionally, the ends 56,58 could be alternatively configured to permit selective interlocking engagement of such alternative ring portions 52,54 (e.g., where the ends 56 are configured to be snapped into engagement with one another either before or after one of the ends 56,58 is inserted into the recess 128).

The interconnected ends 56,58 can be selectively shifted out of engagement with the end-engaging portion 72 to facilitate separation of the ends 56,58. Again, the actuator 120 is initially pressed to unlock the locking mechanism 68 to permit the ring 50 to be shifted out of the first position (see FIG. 7). This movement also causes the ends 56,58 to slide out of engagement with the end-engaging portion 72 (see FIGS. 8, 13, and 14). The ring 50 can then be swung about the hinge portion 60 so that the ends 56,58 are spaced from the body 48 (see FIG. 9). The ring portions 52,54 can then be pulled away from each other to flex the ring 50 and thereby separate the ends 56,58 (see FIGS. 15-18).

While the end-engaging portion 72 preferably slidably receives the ends 56,58 of the ring 50 along the axis A, it is within the ambit of the present invention where the end-engaging portion 72 is alternatively configured to receive and engage the ring 50. For instance, the ends 56,58 could be slidably received by the end-engaging portion 72 by sliding the ends 56,58 along an axis transverse to axis A (e.g., where each ring portion 52,54 is pivotally mounted to pivot about an axis perpendicular to axis A and to the axis of the hinge portion 60).

Again, the illustrated ring portions 52,54 preferably include straight ring sections 148 that converge toward the apex 152 presented by the curved central section 150. Thus, with the connector 40 closed, the straight ring sections 148 preferably converge away from the body 48 to the apex 152. In this manner, the tag 42 is urged toward the apex 152 when pulled away from the body 48. The illustrated apex 152 is preferably spaced substantially equally from the hinged connection 92 and the end-engaging portion 72. However, it is within the ambit of the present invention where the apex 152 is alternatively shaped and/or positioned.

In the illustrated embodiment, each straight ring section 148 cooperates with the respective body side 78 to define an acute angle C1 or C2 therebetween (see FIG. 5). However, as discussed above, the illustrated connector 40 could include a ring portion having various shapes and arrangements such that angle C1 and/or angle C2 is a right angle or an obtuse angle.

Turning to FIG. 5, the ring portions are configured and arranged to provide opposite pairs of straight ring sections 148, where each pair includes a ring section 148a from one of the ring portions on one side of the body 48 and a ring section 148b from the other ring portion on the opposite side of the body 48. Preferably, each pair of ring sections 148a,b is arranged in a nonparallel relationship. Also, for each opposite pair of ring sections 148a,b, one of the ring sections 148b preferably presents a length dimension that is slightly longer than a length dimension of the other ring section 148a. It has been found that these features facilitate a connector arrangement that urges the tag 42 toward the apex 152 when the tag 42 is pulled away from the body 48. However, the opposite pairs of ring sections 148a,b could be alternatively configured without departing from the scope of the present invention. More particularly, if each ring portion 52,54 is connected to an object, the non-parallel relationship of each pair of ring sections 148a,b reduces the risk of the objects getting "caught" along the sections 148a,b when opposite pulling forces are exerted on the objects. That is, the non-parallel relationship helps in ensuring that the objects naturally rest in the apexes 152 of the ring portions 52,54.

In use, the connector 40 is opened by initially depressing the actuator 120 to shift the locking mechanism 68 from the locked position to the unlocked position (see FIG. 7). In the unlocked position, the ring 50 can be grasped and urged so that the hinged connection 92 is shifted from the first position to the second position (see FIGS. 8, 13, and 14). In this manner, the ends 56,58 are shifted out of engagement with the end-engaging portion 72 of the body 48. With the ends 56,58 disengaged from the body 48, the ring 50 can be swung about the hinge portion 60 to further space the ends 56,58 from the body 48 (see FIG. 9). The ring 50 can then be selectively flexed by pulling the ring portions 52,54 apart from one another to separate the ends 56,58 and thereby form the opening 138 (see FIGS. 2, 15, and 16).

It has been determined that the use of the apex 152 (regardless of the material forming the ring 50) is highly beneficial. First, with the object 42 urged toward the apex 152, the object 42 is restricted from sliding freely along the ring 50, which reduces noise. Additionally, because the object 42 is normally positioned at the apex 152, any pulling force exerted on the object 42 is transferred to the ring 50 in a manner that the grooves 164 are forced into compressive contact with the walls 130, which further enhances and secures the closed connection between the body 48 and ring 50.

The connector 40 can be returned to the closed condition by initially returning the ends 56,58 to interlocking engagement. With the actuator 120 depressed, the hinged connection 92 can be shifted into the second position. With the ends 56,58 located adjacent the recess 128, the actuator 120 and ring 50 can be released so that the arms 82,84 urge the hinged connection 92 to return to the first position (see FIGS. 5, 6, 10, and 11).

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A connection device for holding an object, such as a key, dog tag, and the like, said connection device comprising:
    a closed ring having removably interconnected ends,
    said ring being configured to permit selective separation of the ends to define an opening therebetween that is configured to receive at least a portion of the object therethrough; and
    a body coupled with the ring at a connection location spaced from the ends,
    said ring presenting a projecting ring portion defined between the connection location and a respective one of the ends, with the projecting ring portion cooperating with the body to define therebetween a space so as to accommodate the object,
    said body including an end-engaging portion spaced from the connection location,
    said ends being engageable with the end-engaging portion of the body when interconnected to secure the object on the projecting ring portion,
    said ends being removable from engagement with the body so as to facilitate the separation of the ends.

2. The connection device as claimed in claim 1,
    said ring being at least in part flexible to permit separation of the ends when flexed.

3. The connection device as claimed in claim 2,
    said ring being formed of a synthetic resin material.

4. The connection device as claimed in claim 2,
    said ring being configured to yieldably flex as the ends are separated such that the ends are urged toward one another when separated.

5. The connection device as claimed in claim 1,
    each of said ends presenting a locking surface,
    said locking surfaces being complementally shaped and in frictional engagement with one another to cooperatively hold the ends in removable interlocking engagement.

6. The connection device as claimed in claim 5,
    said ends being separable from one another in a separating direction,
    at least one of said ends and said end-engaging portion of the body presenting complementally-shaped shoulders that extend at least substantially transverse to the separating direction,
    said shoulders operably contacting one another when said at least one of the ends engages the end-engaging portion of the body so as to restrict movement of said at least one of the ends away from the body in the separating direction.

7. The connection device as claimed in claim 6,
    said ring presenting a hinge portion at the connection location spaced from the ends,
    said hinge portion cooperating with the body to define a hinged connection about which the ring and body are swingable relative to one another,
    said hinged connection being movable between first and second positions spaced along the body,
    said ends being moveable into engagement with the end-engaging portion of the body when the hinged connection is in the first position and the ends being spaced from the body when the hinged connection is in the second position,
    said ring and body being configured to prevent relative swinging therebetween when the hinged connection is in the first position.

8. The connection device as claimed in claim 5,
    each of said ends including a prong that extends along an axial direction of the ring and presents at least part of the respective locking surface, with the prongs overlapping one another along the axial direction to frictionally engage one another.

9. The connection device as claimed in claim 8,
    said locking surface including a complemental notch and projection that are oriented generally transverse to the axial direction, with one of the prongs presenting the notch and the other of the prongs presenting the projection,
    said projection being removably received in the notch when the ends are in interlocking engagement.

10. The connection device as claimed in claim 1,
    said ring presenting a hinge portion at the connection location spaced from the ends,
    said hinge portion cooperating with the body to define a hinged connection about which the ring and body are swingable relative to one another.

11. The connection device as claimed in claim 10,
    said hinged connection being movable between first and second positions spaced along the body,
    said ends being moveable into engagement with the end-engaging portion of the body when the hinged connection is in the first position and the ends being spaced from the body when the hinged connection is in the second position.

12. The connection device as claimed in claim 11,
    said ring and body being configured to prevent relative swinging therebetween when the hinged connection is in the first position.

13. The connection device as claimed in claim 12,
    said body including a manually actuatable locking mechanism that releasably locks the hinged connection in the first position,
    said ring moving between first and second locations relative to the body which correspond to the first and second positions of the hinged connection,
    said locking mechanism including a lock member shiftable into and out of a locked position in which the lock member is configured to engage the ring to prevent movement of the ring out of the first location.

14. The connection device as claimed in claim 13,
    said locking mechanism including a bias member that resiliently urges the lock member into the locked position,
    said locking mechanism including an actuator that is manually depressible, with the lock member being shifted against the bias when the actuator is depressed,
    said bias member comprising an elongated element that carries the lock member adjacent a cantilevered end thereof, with the element being supported adjacent an opposite end thereof such that resilient flexing of the element relative to the opposite end permits shifting of the lock member into and out of the locked position, said actuator being supported on the element spaced from the opposite end.

15. The connection device as claimed in claim 1,
said ends being separable from one another in a separating direction,
at least one of said ends and said end-engaging portion of the body presenting complementally-shaped shoulders that extend at least substantially transverse to the separating direction,
said shoulders operably contacting one another when said at least one of the ends engages the end-engaging portion of the body so as to restrict movement of said at least one of the ends relative to the body in the separating direction.

16. The connection device as claimed in claim 15,
said ring presenting a hinge portion at the connection location spaced from the ends,
said hinge portion cooperating with the body to define a hinged connection about which the ring and body are swingable relative to one another,
said hinged connection being movable between first and second positions spaced along the body,
said ends being moveable into engagement with the end-engaging portion of the body when the hinged connection is in the first position and the ends being spaced from the body when the hinged connection is in the second position,
said ring and body being configured to prevent relative swinging therebetween when the hinged connection is in the first position.

17. The connection device as claimed in claim 15,
said projecting ring portion including ring sections that converge away from the body to an apex spaced from the respective one of the ends such that an object received on the projecting ring portion is urged toward the apex when pulled away from the body.

18. The connection device as claimed in claim 1,
said projecting ring portion including ring sections that converge away from the body to an apex spaced from the respective one of the ends such that an object received on the projecting ring portion is urged toward the apex when pulled away from the body.

19. A connection device for holding an object, such as a key, dog tag, and the like, said connection device comprisng:
a ring having an end; and
a body coupled with the ring at a connection location spaced from the end,
said ring presenting a projecting ring portion defined between the connection location and the end, with the projecting ring portion cooperating with the body to define therebetween a space so as to accommodate the object,
said body including an end-engaging portion spaced from the connection location,
said end being engageable with the end-engaging portion of the body to secure the object on the projecting ring portion,
said end extending along an axial direction of the ring,
said end and said end-engaging portion of the body presenting complementally-shaped shoulders that extend at least substantially transverse to the axial direction,
said shoulders operably contacting one another when the end engages the end-engaging portion of the body to thereby restrict movement of the end away from the body along the axial direction,
said ring presenting a groove adjacent the end thereof, with the groove extending transverse to the axial direction,
said shoulder associated with the ring defining at least part of the groove.

20. The connection device as claimed in claim 19,
said end-engaging portion including a wall that extends transverse to the axial direction,
said shoulder associated with the end-engaging portion defining at least part of the wall, with the wall being received, by the groove when the end engages the end-engaging portion.

21. The connection device as claimed in claim 20,
said end-engaging portion presenting a recess that receives the end,
said wall being located within the recess.

22. The connection device as claimed in claim 19,
said ring including a second end which is operable with the first-mentioned end to define an opening therebetween, with the opening being configured to receive at least a portion of the object therethrough.

23. The connection device as claimed in claim 22,
said ring presenting a second projecting ring portion defined between the connection location and the second end, with the second projecting ring portion cooperating with the body to define therebetween a second space so as to accommodate the object,
said second end being engageable with the end-engaging portion of the body to secure the object on the second projecting ring portion.

24. A connection device for holding an object, such as a key, dog tag, and the like, said connection device a ring having an end; and
a body coupled with the ring at a connection location spaced from the end,
said ring presenting a projecting ring portion defined between the connection location and the end, with the projecting ring portion cooperating with the body to define therebetween a space so as to accommodate the object,
said body including an end-engaging portion spaced from the connection location,
said end being engageable with the end-engaging portion of the body to secure the object on the projecting ring portion,
said end extending along an axial direction of the ring,
said end and said end-engaging portion of the body presenting complementally-shaped shoulders that extend at least substantially transverse to the axial direction,
said shoulders operably contacting one another when the end engages the end-engaging portion of the body to thereby restrict movement of the end away from the body along the axial direction,
said ring including a second end which is operable with the first-mentioned end to define an opening therebetween, with the opening being configured to receive at least a portion of the object therethrough,
said ring presenting a second projecting ring portion defined between the connection location and the second end, with the second projecting ring portion cooperating with the body to define therebetween a second space so as to accommodate the object,
said second end being engageable with the end-engaging portion of the body to secure the object on the second projecting ring portion, said ends projecting toward one another along a common direction,
said ends extending along an arc that defines the common direction.
25. The connection device as claimed in claim 24,
said ends being removably interconnected, with the opening being defined when the ends are separated,
said ends being engageable with the end-engaging portion of the body when interconnected to further secure the object on either of the projecting ring portions,
said ends being removable from engagement with the body so as to facilitate the separation of the ends.
26. The connection device as claimed in claim 25,
said second end and said end-engaging portion of the body presenting a second set of complementally-shaped shoulders that extend at least substantially transverse to the common direction,
said second set of shoulders operably contacting one another when the second end engages the end-engaging portion of the body to thereby restrict movement of the second end away from the body along the common direction.
27. A connection device for holding an object, such as a key, dog tag, and the like, said connection device comprising:
a ring having an end; and
a body coupled with the ring at a connection location spaced from the end,
said ring presenting ring portion defined between the connection location and the end, with the projecting ring portion cooperating with the body to define therebetween a space so as to accommodate the object,
said body including an end-engaging portion spaced from the connection location,
said end being engageable with the end-engaging portion of the body to secure the object on the projecting ring portion,
said end extending along an axial direction of the ring,
said end and said end-engaging portion of the body presenting complementally-shaped shoulders that extend at least substantially transverse to the axial direction,
said shoulders operably contacting one another when the end engages the end-engaging portion of the body to thereby restrict movement of the end away from the body along the axial direction,
said ring presenting a hinge portion at the connection location spaced from the end,
said hinge portion cooperating with the body to define a hinged connection about which the ring and body are swingable relative to one another.
28. The connection device as claimed in claim 27,
said hinged connection being movable between first and second positions spaced along the body,
said end being moveable into engagement with the end-engaging portion of the body when the hinged connection is in the first position and the end being spaced from the body when the hinged connection is in the second position.
29. The connection device as claimed in claim 28,
said ring and body being configured to prevent relative swinging therebetween when the hinged connection is in the first position.

30. The connection device as claimed in claim 29,
said end-engaging portion presenting a recess that receives the end,
said shoulder associated with the end-engaging portion being located within the recess.
31. The connection device as claimed in claim 29,
said body including a manually actuatable locking mechanism that releasably locks the hinged connection in the first position,
said ring moving between first and second locations relative to the body which correspond to the first and second positions of the hinged connection,
said locking mechanism including a lock, member shiftable into and out of a locked position in which the lock member is configured to engage the ring to prevent movement of the ring out of the first location.
32. The connection device as claimed in claim 31,
said locking mechanism including a bias member that resiliently urges the lock member into the locked position,
said locking mechanism including an actuator that is manually depressible, with the lock member being shifted against the bias when the actuator is depressed,
said bias member comprising an elongated element that carries the lock member adjacent a cantilevered end thereof, with the element being supported adjacent an opposite end thereof such that resilient flexing of the element relative to the opposite end permits shifting of the lock member into and out of the locked position,
said actuator being supported on the element spaced from the opposite end.
33. A connection device for holding an object, such as a key, dog tag, and the like, said connection device comprising:
a ring having an end; and
a body copied with the ring at a connection location spaced from the end,
said ring presenting a projecting ring portion defined between the connection location and the end, with the projecting ring portion cooperating with the body to define therebetween a space so as to accommodate the object,
said hod including an end-engaging portion spaced from the connection location,
said end being engageable with the end-engaging portion of the body to secure the object on the projecting ring portion,
said end extending along an axial direction of the ring,
said end and said end-engaging portion of the body presenting complementally-shaped shoulders that extend at least substantially transverse to the axial direction,
said shoulders operably contacting one another when the end engages the end-engaging portion of the body to thereby restrict movement of the end away from the body along the axial direction,
said projecting ring portion including ring sections that converge away from the body to an apex spaced from the end such that an object received on the projecting ring portion is urged toward the apex when pulled away from the body.

* * * * *